United States Patent [19]

Saboe et al.

[11] 4,247,259
[45] Jan. 27, 1981

[54] COMPOSITE CERAMIC/METALLIC TURBINE BLADE AND METHOD OF MAKING SAME

[75] Inventors: Michael S. Saboe, Trumbell; Barry Goldblatt, Orange, both of Conn.

[73] Assignee: Avco Corporation, Stratford, Conn.

[21] Appl. No.: 31,046

[22] Filed: Apr. 18, 1979

[51] Int. Cl.² ................ B21K 3/04; F01D 5/14; B05D 3/02
[52] U.S. Cl. ................ 416/241 B; 29/156.8 H; 427/295; 428/36; 416/226; 427/374.2; 427/374.4; 427/374.6; 427/383.7
[58] Field of Search ............ 29/156.8 H; 416/241 B, 416/226; 415/214; 427/216, 279, 295, 383 C, 374 A, 374 C, 374 E; 428/36

[56] References Cited

U.S. PATENT DOCUMENTS

| | | | |
|---|---|---|---|
| 2,479,067 | 8/1949 | Bodger | 416/241 B |
| 3,378,228 | 4/1968 | Davies et al. | 416/241 B |
| 3,443,792 | 5/1969 | Moss | 416/241 B |
| 3,778,188 | 12/1973 | Aspinnall | 416/241 B |
| 3,844,727 | 10/1974 | Copley et al. | 29/156.8 H |
| 3,844,728 | 10/1974 | Copley et al. | 29/156.8 H |
| 4,024,617 | 5/1977 | McCormick | 427/374 A |
| 4,063,850 | 12/1977 | Hueber et al. | 415/214 |
| 4,067,662 | 1/1978 | Rossmann | 416/241 B |

Primary Examiner—William R. Dixon, Jr.
Attorney, Agent, or Firm—Ralph D. Gelling

[57] ABSTRACT

A composite, ceramic/metallic fabricated blade unit for an axial flow rotor includes an elongated metallic support member having an airfoil-shaped strut, one end of which is connected to a dovetail root for attachment to the rotor disc, while the opposite end thereof includes an end cap of generally airfoil-shape. The circumferential undercut extending between the end cap and the blade root is clad with an airfoil-shaped ceramic member such that the cross-section of the ceramic member substantially corresponds to the airfoil-shaped cross-section of the end cap, whereby the resulting composite ceramic/metallic blade has a smooth, exterior airfoil surface. The metallic support member has a longitudinally extending opening through which coolant is passed during the fabrication of the blade. Simultaneously, ceramic material is applied and bonded to the outer surface of the elongated airfoil-shaped strut portion, with the internal cooling of the metallic strut during the processing operation allowing the metal to withstand the processing temperature of the ceramic material.

14 Claims, 3 Drawing Figures

U.S. Patent
Jan. 27, 1981
4,247,259
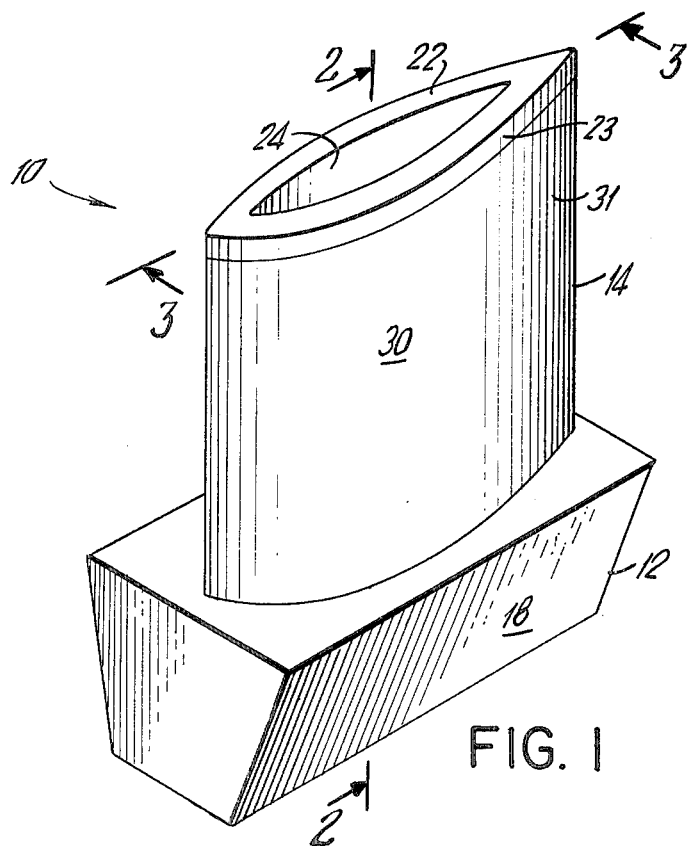
FIG. 1
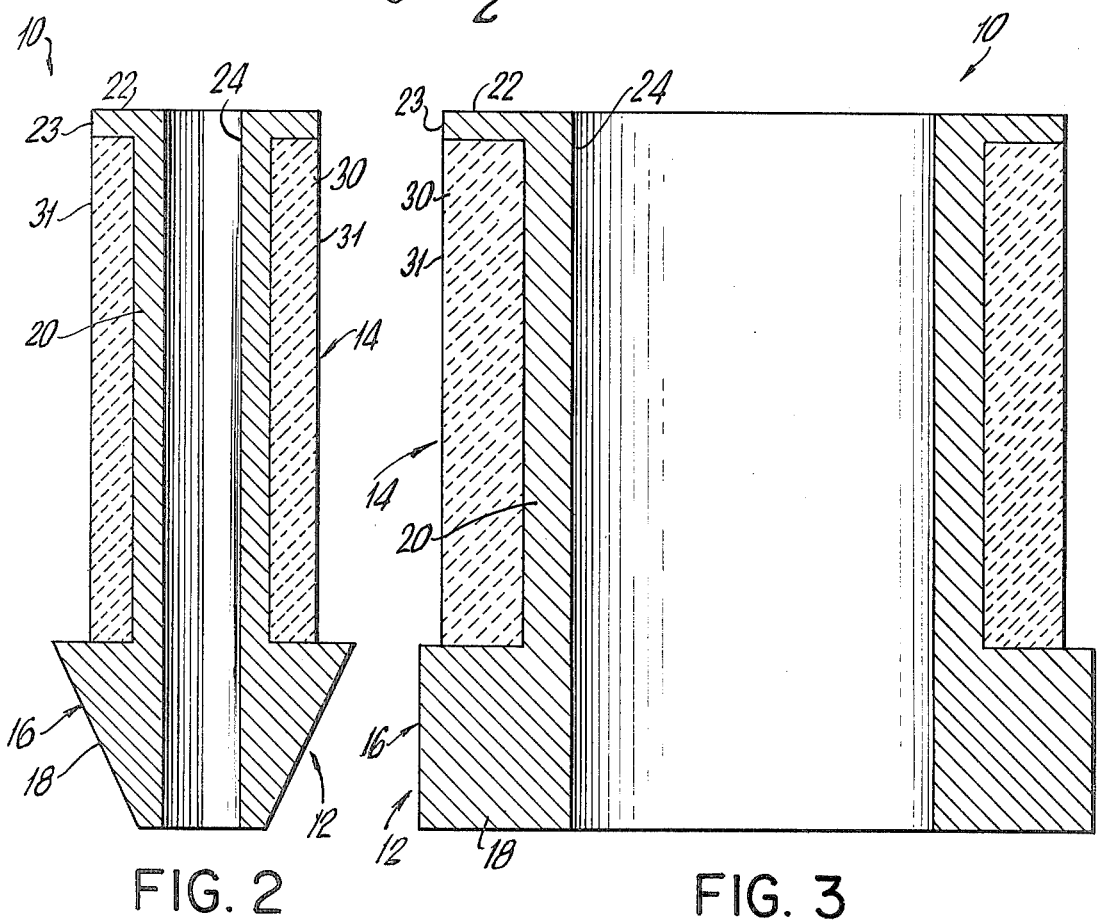
FIG. 2
FIG. 3

COMPOSITE CERAMIC/METALLIC TURBINE BLADE AND METHOD OF MAKING SAME

The subject invention relates to a new and improved composite ceramic/metallic turbine blade for use in a gas turbine engine, and more particularly, a turbine blade having a ceramic airfoil mounted on a hollow metal strut. The subject invention also relates to a new and improved method for forming such turbine blade wherein the ceramic material is formed in situ on the metal strut while the latter is simultaneously cooled thereby insuring that the stresses in the ceramic material after fabrication and during its operational cycle are compressive for providing optimum reliability of the turbine blade.

Considerable improvements are available in gas turbine performance through the use of ceramic turbine airfoils. It is well known that the use of metal refractory composites such as ceramics has long been recognized as offering special advantages as structural materials for the high temperature applications in gas turbine engines. In a gas turbine engine, the gas contacting elements, such as the blades of the turbine and compressor of an engine, are continuously subjected to a very severe and complex environment, such as high temperatures, severe thermal gradients, erosion, and forces which tend to deform the blades. Accordingly, ceramic materials would appear to be particularly suited for such high temperature applications, however, by their very nature ceramics are extremely brittle and are consequently difficult to handle and to use in a gas engine turbine design.

Heretofore, many composite ceramic/metal blade designs have been developed, as well as processes of making same, in which various methods have been devised to attach the ceramic components to the remainder of the metallic engine structure. Primarily, the prior art methods rely on sophisticated mechanical arrangements of soft cushions or the like to reduce the contact loads between a ceramic blade and the metallic hub material, or the use of sophisticated mechanical rods, bolts, attachments, etc. to hold together components of a composite ceramic/metallic blade. As an example, U.S. Pat. No. 3,443,792 to Moss which issued on May 13, 1969 and U.S. Pat. No. 3,378,228 to Davies et al, issued Apr. 16, 1968 disclose ceramic blade structures which are attached to the turbine rotor by means of metal pins extending through a bore in the ceramic blades. In the prior art blade structures described in U.S. Pat. Nos. 3,433,792 and 3,378,228, the ceramic portion of the composite blade is first fabricated, and then is mechanically assembled to the metallic hub or disc with a metallic pin.

U.S. Pat. No. 2,479,057 which issued to Bodger on Aug. 16, 1949 also shows a mechanical assembly of a turbine rotor having a radially extending metallic post which is adapted to receive a ceramic blade, the latter being held in place by an outer metallic shroud segment welded to the metallic post. As in the case of the above mentioned prior art patents, the ceramic portion of the turbine blade of U.S. Pat. No. 2,479,057 is first fabricated, and is then mechanically connected to the metallic support structure of the turbine blade assembly.

Other forms of ceramic/metallic blades are exemplified by the ceramic blade structures of U.S. Pat. Nos. 3,844,727 and 3,844,728 both of which issued to Copley et al on Oct. 29, 1974, wherein a plurality of wires or rods are formed within an airfoil-shaped ceramic central body.

In view of the high centrifugal stresses which are imposed on a composite blade by the high speed rotation of the rotor, it is readily apparent that sophisticated mechanical arrangements of soft cushions, rods, bolts and the like are susceptible to failure by virtue of the high tensile forces imposed on the ceramic portions of the composite blades. More particularly, ceramic materials have excellent compressive strength, however, their effective tensile strength is reduced by minute flaws which are inherent in any material, but which have a greater effect on brittle materials such as ceramics.

Accordingly, it is an object of the subject invention to provide a new and improved composite ceramic/metallic blade where the ceramic component is always in compression, and where the composite blade is secured to the rotor disc by a dovetail root formed integral with the blade, and wherein the composite blade is fabricated without resort to the use of sophisticated mechanical arrangements of soft cushions, bolts, rods, etc.

It is a further object of the subject invention to provide a new and improved method of making a composite ceramic/metallic rotor blade, wherein the ceramic material is formed in place around the metal support strut, by sintering, reaction bonding, or vapor deposition, and wherein the metal strut is simultaneously internally cooled during the formation of the ceramic member to allow the metal to withstand the processing temperature of the ceramic material.

The structure of the present invention is one which is comprised of a central, hollow, metallic support member including an elongated, airfoil-shaped strut, the radially inner end of which terminates in a dovetail root for attachment to a turbine disc, while the tip thereof terminates in an airfoil-shaped end cap of greater cross-sectional area than the airfoil-shaped strut. An elongated, airfoil-shaped ceramic member is bonded to the outer surface of the elongated airfoil-shaped strut and extends between the end cap and the root, with the configuration of the ceramic member substantially corresponding to the enlarged airfoil-shaped configuration of the end cap such that the resulting fabricated, composite ceramic/metal blade has a smooth, exterior airfoil surface.

The process or method for producing the fabricated blade of the subject invention includes the step of forming the ceramic material in place around the metal strut by means such as sintering, reaction bonding, or vapor deposition, and during the application of the ceramic material to the metal strut, the latter is simultaneously internally cooled to allow the metal to withstand the processing temperature of the ceramic material.

The foregoing and other objects, features and advantages of the present invention will become apparent in light of the following detailed description of the preferred embodiment thereof, as illustrated in the accompanying drawings in which:

FIG. 1 is a perspective view of the new and improved composite ceramic/metallic blade of the subject invention;

FIG. 2 is a cross-sectional view of the subject composite blade taken along line 2—2 in FIG. 1; and FIG. 3 is a cross-sectional view of the subject composite blade taken along line 3—3 in FIG. 1.

Referring to FIG. 1, the composite, fabricated blade of the subject invention is generally designated by the numeral 10 and includes a root portion 12 of generally dovetail or firtree shaped configuration for engagement with a similarly configured cut-out in a turbine rotor disc (not shown), and an airfoil vane portion 14. The composite blade 10 is formed of a metallic support member 16 (see FIGS. 2 and 3) and a ceramic member 30. The metallic support member 16 is generally elongated and includes base 18 defining the dovetail root 12, an intermediate, elongated airfoil-shaped strut 20, and an end cap or flange 22 disposed at the opposite end of the strut 20. Preferably, the metallic support member 16 is of unitary construction and is formed of a high temperature metallic material. Extending longitudinally through the metallic support member 16 is an elongated aperture 24, which aperture 24 may be utilized during engine operation to pass coolant through the composite blade 10, as more fully described hereinafter.

The intermediate metallic strut 20 is of generally airfoil-shaped configuration, and substantially corresponds to the configuration of the airfoil-shaped end cap 22, however, the cross-sectional area of the end cap 22 is greater than the cross-sectional area of the strut 20 such that the peripheral surface 23 of end cap 22 extends beyond the outer surface of the strut 20. Likewise, the upper surface of the base 18 which is connected to the struct 20 is of greater plan area than the cross-sectional area of the intermediate strut 20 such that a circumferential undercut is defined in the metallic support member 16 extending between the lower surface of the end cap 22 and the upper surface of the base 18.

The ceramic 30 is formed in place around the metal strut 20 in the undercut between the end cap 22 and the base 18, and is of generally elongated, airfoil-shaped configuration, with the outer surface 31 thereof corresponding in configuration to the peripheral edge 23 of the end cap 22. By this arrangement, the fabricated blade 10 has a smooth, exterior airfoil surface extending between the upper surface of the base 18 to the blade tip at end cap 22.

In the process of the subject invention, the metallic support member 16 is cooled by the passage of coolant through the longitudinally-extending opening 24, and simultaneously the ceramic material 30 is applied and bonded to the outer surface of the elongated strut 20 by means of sintering, reaction bonding, or vapor deposition. The coolant passing through the metallic support member 16 allows the metal to withstand the processing temperature of the ceramic material. By virtue of the fact that the ceramic material 30 is fabricated in place around the metal strut 20, rather than being initially fabricated in final form and then connected to the metal structure of the rotor as in prior art processes, the ceramic material 30 is thus fabricated and maintained under compression. Accordingly, the compressive stresses in the ceramic material 30 after fabrication and during its operational cycle in a gas turbine engine provide optimum reliability of the composite blade 10.

The composite blade is secured to a turbine disc by means of the root 12, and during engine operation, if necessary, coolant fluid may be passed through the central aperture 24 for reducing the operational temperature of the blade.

While the invention has been shown and described with respect to a single embodiment and a method of making same, it will be obvious to those skilled in the art that it is not so limited, but is susceptible of various changes and modifications without departing from the scope and spirit thereof as defined by the following claims

What is claimed is:

1. A composite, fabricated blade unit for an axial flow rotor comprising:
    a metallic support member including an elongated, airfoil-shaped strut having at one end a root portion while the opposite end thereof is an airfoil-shaped end cap, the cross-section of said end cap corresponding in configuration to and being of greater area than the cross-section of the strut, while the cross-sectional area of the surface of the root which is connected to the strut is of greater cross-sectional area than the cross-sectional area of the strut; and
    an elongated, airfoil-shaped ceramic member bonded to the outer surface of the elongated airfoil-shaped strut and extending between the end cap and said surface of the root, with the cross-section of the ceramic member substantially corresponding to the airfoil-shaped, cross-section of the end cap such that the fabricated blade has a smooth, exterior airfoil surface.

2. A composite fabricated blade unit for an axial flow rotor as in claim 1 wherein said elongated, metallic support member is hollow.

3. A composite fabricated blade unit for an axial flow rotor as in claim 1 wherein the root portion of the metallic support member is of dove-tail configuration.

4. A composite fabricated blade unit for an axial flow rotor as in claim 1 wherein the cross-sectional area of the surface of the root which is connected to the strut is greater than the cross-sectional area of said end cap.

5. A composite fabricated blade unit for an axial flow rotor as in claim 1 wherein said ceramic member is bonded to the metallic support member by sintering.

6. A composite fabricated blade unit for an axial flow rotor as in claim 1 wherein said ceramic member is reaction bonded to said metallic support member.

7. A composite fabricated blade unit for an axial flow rotor as in claim 1 wherein said ceramic member is vapor deposited on said metallic support member.

8. A composite fabricated blade unit for an axial flow rotor as in claim 1 wherein said airfoil-shaped struct and the metallic support member are formed of a unitary member.

9. A composite fabricated blade unit for an axial flow rotor comprising:
    a hollow, metallic support member including an elongated, airfoil-shaped strut having at one end a root portion while at the opposite end thereof is an airfoil-shaped end cap, the cross-section of said end cap corresponding in configuration to and being of greater area than the cross-section of the strut, while the cross-section of the surface of the root which is connected to the strut is of greater cross-sectional area than the cross-sectional area of the end cap; and
    an elongated, airfoil-shaped ceramic member bonded to the outer surface of the elongated airfoil-shaped strut and extending between the end cap and said surface of the root, with the configuration of the ceramic member substantially corresponding to the airfoil-shaped configuration of the end cap such that the fabricated blade has a smooth, exterior airfoil surface.

10. A composite fabricated blade unit for an axial flow rotor as in claim 9 wherein said root portion is of a dovetail configuration.

11. A method of manufacturing a composite ceramic/metallic blade unit for an axial flow rotor comprising the steps of:

providing a hollow, metallic support member including an elongated, airfoil-shaped strut having at one end a root portion while the opposite end thereof is an airfoil-shaped end cap, the cross-section of said end cap corresponding in configuration to and being of greater area than the cross-section of the strut, while the cross-sectional area of the surface of the root which is connected to the strut is of greater cross-sectional area than the cross-sectional area of the strut;

cooling said metallic support member by passing coolant through the opening extending through the length thereof; and simultaneously applying and bonding a ceramic material to the outer surface of the elongated airfoil-shaped strut between the end cap and said surface of the root until the cross-sectional configuration of the ceramic member substantially corresponds to the airfoil-shaped configuration of the end cap such that the fabricated blade has a smooth, exterior airfoil surface.

12. A method of manufacturing a composite ceramic/metallic blade unit for an axial flow rotor as in claim 11 wherein said ceramic member is applied to the metallic support member by sintering.

13. A method of manufacturing a composite ceramic/metallic blade unit for an axial flow rotor as in claim 12 wherein said ceramic member is applied to the metallic support member by reaction bonding.

14. A method of manufacturing a composite ceramic/metallic blade unit for an axial flow rotor as in claim 13 wherein said ceramic member is applied to the metallic support member by vapor deposition.

* * * * *

UNITED STATES PATENT AND TRADEMARK OFFICE
CERTIFICATE OF CORRECTION

PATENT NO. : 4,247,259
DATED : January 27, 1981
INVENTOR(S) : Michael S. Saboe and Barry Goldblatt It is certified that error appears in the above-identified patent and that said Letters Patent are hereby corrected as shown below:

Column 3, line 26, please change "struct" to ---strut---.

Column 3, line 32, after "ceramic" insert ---member---.

Column 4, line 45, please change "struct" to ---strut---.

Signed and Sealed this

Twenty-sixth Day of May 1981

[SEAL]

Attest:

RENE D. TEGTMEYER

Attesting Officer     Acting Commissioner of Patents and Trademarks